(12) United States Patent
Hamamoto et al.

(10) Patent No.: US 8,133,957 B2
(45) Date of Patent: Mar. 13, 2012

(54) RESIN COMPOSITION FOR ENCAPSULATING OPTICAL SEMICONDUCTOR ELEMENT

(75) Inventors: Yoshihira Hamamoto, Takasaki (JP); Toshio Shiobara, Annaka (JP); Miyuki Wakao, Takasaki (JP); Tsutomu Kashiwagi, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 288 days.

(21) Appl. No.: 12/510,491

(22) Filed: Jul. 28, 2009

(65) Prior Publication Data

US 2010/0029887 A1    Feb. 4, 2010

(30) Foreign Application Priority Data

Jul. 29, 2008 (JP) .................... 2008-195122

(51) Int. Cl.
*C08G 77/14* (2006.01)
(52) U.S. Cl. .......................... 525/476; 528/26
(58) Field of Classification Search .................. 525/476; 528/26
See application file for complete search history.

(56) References Cited

U.S. PATENT DOCUMENTS

| 5,492,981 | A | 2/1996 | Hoehn et al. |
| 5,891,969 | A * | 4/1999 | Mine et al. ............... 525/476 |
| 6,221,510 | B1 | 4/2001 | Noro et al. |
| 6,916,889 | B2 * | 7/2005 | Rubinsztajn et al. ...... 525/476 |
| 2002/0145152 | A1 | 10/2002 | Shimomura |
| 2002/0190262 | A1 | 12/2002 | Nitta et al. |
| 2005/0272896 | A1 | 12/2005 | Kaji et al. |
| 2005/0282975 | A1 | 12/2005 | Haitko et al. |
| 2007/0225465 | A1 | 9/2007 | Akiike et al. |
| 2010/0140537 | A1 | 6/2010 | Morita et al. |

FOREIGN PATENT DOCUMENTS

| EP | 0 620 242 | 10/1994 |
| EP | 0 789 057 | 8/1997 |
| JP | 11-302499 A | 11/1999 |
| JP | 2004-99751 A | 4/2004 |
| JP | 2005-263869 A | 9/2005 |
| JP | 2005-343998 A | 12/2005 |
| JP | 2008-63565 A | 3/2008 |
| JP | 2008-120843 A | 5/2008 |
| JP | 2008-156475 A | 7/2008 |
| SU | 1016337 | 5/1983 |
| WO | 2005/044920 | * 5/2001 |
| WO | WO 2005-100445 A1 | 10/2005 |

OTHER PUBLICATIONS

Office Action in Japanese Application No. 2008-195122 mailed Nov. 9, 2010, including English translation.
Database WPI Week 198411, Thomson Scientific, London, GB; AN 1984-067254, XP002550299 (corresponding to SU 1016337 A dated May 7, 1983).
European Search Report issued Oct. 22, 2009, in connection with European Patent Application No. 09009739.5.

* cited by examiner

*Primary Examiner* — Margaret Moore
(74) *Attorney, Agent, or Firm* — Birch, Stewart, Kolasch & Birch, LLP

(57) ABSTRACT

A resin composition for encapsulating an optical semiconductor element that comprises components (A), (B) and (C) described below:

(A) a branched silicone resin containing 2 to 6 epoxy groups, one or more ($R^1SiO_{3/2}$) units, two or more ($R^2R^3SiO$)$_n$ structures and 3 or more ($R^4_{3-x}R^5_xSiO_{1/2}$) units per molecule, in an amount of 100 parts by weight, wherein $R^1$, $R^2$, $R^3$, $R^4$ and $R^5$ each represents a hydrogen atom, a hydroxyl group or a monovalent organic group of 1 to 20 carbon atoms which monovalent organic group may or may not contain an oxygen atom, provided that at least two of the $R^5$ groups within each molecule represent an epoxy group and/or an epoxy group-containing non-aromatic group, n represents an integer of 3 to 20, and x represents an integer of 1 to 3, (B) a curing agent, in such an amount that a content of epoxy reactive groups in the component (B) ranges from 0.4 to 1.5 moles per 1 mol of epoxy groups within component (A), and (C) a curing catalyst, in an amount within a range from 0.01 to 3 parts by weight per 100 parts by weight of a combination of component (A) and component (B).

9 Claims, No Drawings

RESIN COMPOSITION FOR ENCAPSULATING OPTICAL SEMICONDUCTOR ELEMENT

BACKGROUND OF THE INVENTION

1. Field of the Invention

The present invention relates to a composition used for encapsulating an optical semiconductor element, and more specifically, relates to a resin composition for encapsulating an optical semiconductor element that contains an epoxy-modified branched silicone resin and yields a cured product which exhibits excellent levels of hardness and crack resistance.

2. Description of the Prior Art

Conventionally, epoxy resin compositions have been widely used for encapsulating optical semiconductor elements. These epoxy resin compositions typically comprise an alicyclic epoxy resin, a curing agent and a curing catalyst, and a casting or transfer molding method or the like is typically used to encapsulate the optical semiconductor element, by pouring the epoxy resin composition into a mold inside which the optical semiconductor element has been positioned, and then curing the resin composition.

However in recent years, as the brightness and power output of LEDs have increased, discoloration and degradation problems have started to emerge for epoxy resins. In particular, transparent epoxy resins tend to suffer from yellowing upon exposure to blue light or ultraviolet light, resulting in a shortening of lifetime of the LED element.

As a result, silicone resins, which exhibit excellent heat resistance and light resistance, are now starting to be used, although the strength of the cured resin is weaker than an epoxy resin. Accordingly, high-hardness rubber-like silicone resins have been proposed for use in encapsulation applications (see Patent Document 1 and Patent Document 2).

However, these high-hardness silicone resins have poor adhesiveness, and in encased light emitting semiconductor devices, namely devices in which a light emitting element is placed inside a ceramic and/or plastic casing, and the inside of the casing is then filled with the silicone resin, thermal shock testing at −40 to 120° C. tends to cause the silicone resin to detach from the ceramic or plastic of the casing.

In order to improve the resistance to thermal shock, silicone resins containing epoxy groups have been proposed (see Patent Document 3). However, these silicone resins are synthesized by condensing an epoxy group-containing silane and a silanol, and the cured products of these silicone resins tends to be brittle and have a low elastic modulus. As a result, an LED encapsulated with this type of resin tends to develop cracks within the resin during temperature cycle testing.

Known materials for resolving this cracking problem include compositions comprising an epoxy resin and a silsesquioxane containing at least two epoxy rings (see Patent Document 4), and compositions comprising an epoxy resin and a silicone resin containing an isocyanuric acid derivative group (see Patent Document 5). However, even these compositions cannot be claimed to yield cured products that offer completely satisfactory resistance to cracking during temperature cycle testing.

[Patent Document 1] US 2002/0145152 A1
[Patent Document 2] US 2002/0190262 A1
[Patent Document 3] U.S. Pat. No. 5,492,981
[Patent Document 4] JP 2005-263869 A
[Patent Document 5] JP 2004-99751 A

SUMMARY OF THE INVENTION

The present invention has been developed in light of the circumstances described above, and has an object of providing a resin composition for encapsulating an optical semiconductor element that yields a cured product which exhibits excellent levels of hardness, light resistance and thermal shock resistance.

The present invention provides a resin composition for encapsulating an optical semiconductor element that comprises components (A), (B) and (C) described below:

(A) a branched silicone resin containing 2 to 6 epoxy groups, one or more $(R^1SiO_{3/2})$ units, two or more $(R^2R^3SiO)_n$ structures and 3 or more $(R^4_{3-x}R^5_xSiO_{1/2})$ units per molecule, in an amount of 100 parts by weight, wherein $R^1$, $R^2$, $R^3$, $R^4$ and $R^5$ each represents a hydrogen atom, a hydroxyl group or a monovalent organic group of 1 to 20 carbon atoms which monovalent organic group may or may not contain an oxygen atom, provided that at least two of the $R^5$ groups within each molecule represent an epoxy group and/or an epoxy group-containing non-aromatic group, n represents an integer of 3 to 20, and x represents an integer of 1 to 3, (B) a curing agent, in such an amount that a content of epoxy reactive groups in the component (B) ranges from 0.4 to 1.5 moles per 1 mol of epoxy groups within component (A), and (C) a curing catalyst, in an amount within a range from 0.01 to 3 parts by weight per 100 parts by weight of a combination of component (A) and component (B).

The resin composition of the present invention comprises a silicone resin having a continuous linear segment that contains epoxy groups at least at the two terminals of the molecule, and a branched segment, and can therefore be used to produce an optical semiconductor package that has a high level of hardness and yet also exhibits favorable thermal shock resistance.

DETAILED DESCRIPTION OF THE PREFERRED EMBODIMENTS

In the composition of the present invention, the branched silicone resin (A) contains 2 to 6 epoxy groups, and preferably 3 to 4 epoxy groups, per molecule. If the number of epoxy groups is fewer than the lower limit of the above range, then the hardness of the cured product tends to decrease, whereas if the number of epoxy groups exceeds the upper limit of the above range, the cured product is prone to becoming overly hard and brittle.

The branched silicone resin (A) contains at least one $(R^1SiO_{3/2})$ unit and two or more $(R^2R^3SiO)_n$ structures (wherein n is an integer of 3 to 20). Because the resin includes branching, the hardness of the cured product is higher, and because the resin also includes a linear siloxane chain in which n is 3 or greater, the cured product exhibits superior crack resistance.

The $(R^2R^3SiO)_n$ structure with n being 3 is as shown below.

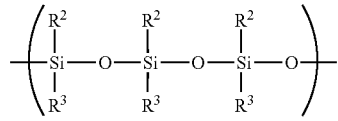

The $(R^2R^3SiO)_n$ structure may exist on either the main chain or a side chain. n is an integer of 3 to 20, and is preferably from 3 to 10. Furthermore, the value of n within each unit may be different.

Each $R^1$, $R^2$ and $R^3$ group represents, independently within each unit, a hydrogen atom, a hydroxyl group, or a monovalent organic group of 1 to 20 carbon atoms which monovalent organic group may or may not contain oxygen atom. Examples of this organic group include alkyl groups such as a methyl group, ethyl group, propyl group and butyl group, cycloalkyl groups such as a cyclopentyl group and cyclohexyl group, aryl groups such as a phenyl group, alkaryl groups such as a tolyl group, cross-linked cyclic groups such as a norbornyl group, and alkoxy groups such as a methoxy group and ethoxy group, as well as the after-mentioned epoxy group and epoxy group-containing non-aromatic groups described below. The organic group is preferably a methyl group or a phenyl group.

The $(R^4_{3-x}R^5_xSiO_{1/2})$ units are terminal units represented by the formula shown below.

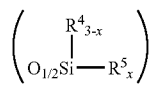

In the above formula, x is an integer of 1 to 3, and $R^4$ and $R^5$ each represents a hydrogen atom, a hydroxyl group, or a monovalent organic group of 1 to 20 carbon atoms which monovalent organic group may or may not contain an oxygen atom. Examples of these monovalent organic groups include the same groups as those listed above in relation to $R^1$, $R^2$ and $R^3$. $R^4$ and $R^5$ are each preferably an alkoxy group of 1 to 5 carbon atoms, and more preferably a methoxy group, ethoxy group or propoxy group, or an epoxy group or epoxy group-containing non-aromatic group.

At least two, and preferably three or more of the $R^5$ groups in each molecule are epoxy groups and/or epoxy group-containing non-aromatic groups. An epoxy group-containing non-aromatic group is a non-aromatic group that contains an epoxy group, and examples of such groups include epoxy group-containing oxyalkyl groups such as a γ-glycidoxy group, epoxy group-containing aliphatic groups such as a β-(3,4-epoxycyclohexyl)ethyl group, as well as a monoglycidylisocyanuryl group or diglycidylisocyanuryl group. Of these, a β-(3,4-epoxycyclohexyl)ethyl group is preferred. A non-aromatic group that contains an oxetanyl group instead of an epoxy group is also acceptable, although in terms of curability, an epoxy group is preferred. Further, one epoxy group preferably exists at both terminals of the molecule, and more preferably at least one epoxy group exists at each terminals of the main chain and the side chains.

The branched silicone resin (A) is preferably represented by the average composition formula (1) shown below.

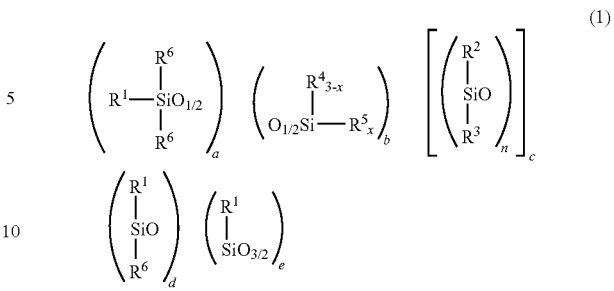

(1)

In formula (1), $R^1$ to $R^5$, n and x are as defined above. $R^6$ represents a hydroxyl group or an alkoxy group of 1 to 6 carbon atoms, and is preferably a methoxy group or ethoxy group. Furthermore, a is a number from 0 to 0.3, and preferably from 0 to 0.2, b is a number from 0.3 to 0.7, and preferably from 0.4 to 0.6, c is a number from 0.2 to 0.6, and preferably from 0.3 to 0.4, d is a number from 0 to 0.3, and preferably from 0 to 0.2, and e is a number from 0.1 to 0.4, and preferably from 0.1 to 0.2, provided that the sum of a to e is 1. A branched silicone resin in which a, b, c, d and e satisfy the respective ranges above has a viscosity at 25° C. within a range from 100 to 100,000 mPa·s, and is easy to handle.

The branched silicone resin (A) can be synthesized by subjecting a trifunctional organosilicon compound represented by $R^1SiX_3$ (wherein $R^1$ is as defined above, and X represents a hydrolyzable group such as a halogen atom or an alkoxy group), and an organosilicon compound containing a $(R^2R^3SiO)_n$ structure (wherein n=3 to 10) and represented by a formula shown below

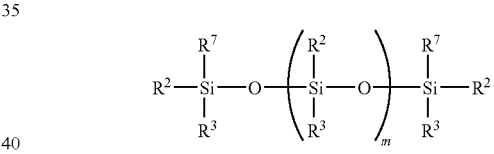

(wherein $R^2$ and $R^3$ are as defined above, m=1 to 8, and $R^7$ represents a hydrolyzable group such as an alkoxy group) to a hydrolysis and condensation reaction in accordance with a conventional method, thus forming an oligomer, and then reacting the oligomer with an epoxy group-containing silane represented by a formula shown below.

(wherein $R^5$ is as defined above, $R^8$ represents a hydrolyzable group, and x is an integer of 1 to 3.)

A styrene-referenced weight average molecular weight of the branched silicone resin (A), measured by GPC, is typically within a range from 4,000 to 10,000, and is preferably from 4,000 to 6,000. Further, the epoxy equivalent weight is typically within a range from 200 to 600 g/mol, and is preferably from 300 to 500 g/mol.

In the composition of the present invention, examples of the curing agent (B) include amine-based curing agents, phenol-based curing agents and acid anhydride-based curing agents, and of these, acid anhydride-based curing agents are preferred.

Examples of acid anhydride-based curing agents include phthalic anhydride, maleic anhydride, trimellitic anhydride, pyromellitic anhydride, hexahydrophthalic anhydride, 3-methyl-hexahydrophthalic anhydride, 4-methyl-hexahydrophthalic anhydride, mixtures of 3-methyl-hexahydrophthalic anhydride and 4-methyl-hexahydrophthalic anhydride, tetrahydrophthalic anhydride, nadic anhydride, methylnadic anhydride, norbornane-2,3-dicarboxylic anhydride, and methylnorbornane-2,3-dicarboxylic anhydride. The blend amount of the curing agent (B) is such that a content of an epoxy reactive group in the component (B) ranges from 0.4 to 1.5 moles per 1 mol of epoxy groups in component (A). In other words, the blend amount is typically within a range from 0.4 to 1.5 equivalents, and preferably from 0.5 to 1.0 equivalent, per one equivalent of the component (A).

Examples of the curing catalyst (C) include quaternary phosphonium salts such as tetrabutylphosphonium O,O-diethyl phosphorodithioate and tetraphenylphosphonium tetraphenylborate, organophosphine-based curing catalysts such as triphenylphosphine and diphenylphosphine, tertiary amine-based curing catalysts such as 1,8-diazabicyclo(5,4,0)undecene-7, triethanolamine and benzyldimethylamine, quaternary ammonium salt-based curing catalysts such as 1,8-diazabicyclo(5,4,0)undecene-7 phenolate, 1,8-diazabicyclo(5,4,0)undecene-7 octanoate and 1,8-diazabicyclo(5,4,0)undecene-7 toluenesulfonate, and imidazoles such as 2-methylimidazole and 2-phenyl-4-methylimidazole. Of these, quaternary phosphonium salts and quaternary ammonium salts are preferred.

The blend amount of the curing catalyst (C) is typically within a range from 0.01 to 3 parts by weight, and preferably from 0.05 to 3 parts by weight, per 100 parts by weight of the combination of (A)+(B). If the blend amount of the curing catalyst is less than the lower limit of this range, then the catalyst may not provide sufficient acceleration of the reaction between the epoxy resin and the curing agent. In contrast, if the blend amount of the curing catalyst exceeds the upper limit of the above range, then the curing catalyst may cause discoloration, either during curing or during reflow testing.

The composition of the present invention preferably also includes: (D) a non-aromatic epoxy resin having at least two epoxy groups within each molecule. Examples of this epoxy resin include alicyclic epoxy resins such as diepoxy acetals, diepoxy adipates, diepoxy carboxylates, and dicyclopentadiene-based epoxy resins; isocyanurate derivative epoxy resins such as triglycidyl isocyanurate; and hydrogenated epoxy resins prepared by hydrogenating the aromatic ring(s) within aromatic epoxy resins such as bisphenol A epoxy resins, bisphenol F epoxy resins, phenol novolak epoxy resins, cresol novolak epoxy resins, naphthalene epoxy resins, biphenyl epoxy resins, aralkyl epoxy resins and biphenylaralkyl epoxy resins. Two or more of these resins may also be used in combination. Of these epoxy resins, a diepoxy carboxylate is preferred, and (3',4'-epoxycyclohexane)methyl 3,4-epoxycyclohexyl-carboxylate is particularly desirable.

The blend amount of the epoxy resin (D) is typically not more than 50 parts by weight per 100 parts by weight of the combination of component (A) and component (D). If the blend amount exceeds the upper limit of this range, then in those cases where the light emitting element emits ultraviolet light, the cured product of the resin composition is prone to deterioration upon exposure to the ultraviolet light. Accordingly, the epoxy resin (D) is preferably used in a blend amount of not more than 30 parts by weight.

In addition to the components described above, antioxidants, ultraviolet absorbers, age resistors, phosphors for altering the wavelength, inorganic fillers such as silica or titanium oxide fine powders, silane coupling agents, thermoplastic agents and diluents may also be included within the composition of the present invention according to need, provided they do not impair the object of the present invention. Hindered phenol-based antioxidants and phosphorus-based antioxidants are preferred as the antioxidant. Hindered amine-based ultraviolet absorbers are preferred as the ultraviolet absorber. Mercapto-based silane coupling agents are preferred as the silane coupling agent.

The composition of the present invention can be produced by combining the components (A) to (D) and any of the optional additives as desired, and then performing melt mixing. The melt mixing may be conducted using a conventional method, for example, a batch process in which the above components are combined in a reactor and melt mixed or a continuous process in which each of the above components is supplied to a mixing device such as a kneader or triple roll mill.

The prepared resin composition for encapsulating an optical semiconductor element can be used by injecting the resin composition, in the form of the melt mixture obtained from the above method, into a mold or casing inside which a light emitting element has been mounted, subsequently B-staging the resin composition at a predetermined temperature, and then solidifying the composition.

Furthermore, the resin composition may also be used for protecting an LED mounted on a matrix-type substrate, by applying the composition to the LED using a potting method, printing method, transfer molding method, injection molding method or compression molding method. In those cases where a light emitting semiconductor device such as an LED is coated and protected by potting or injection, the composition of the present invention is preferably in liquid form. In other words, the viscosity of the resin composition, reported as a value measured at 25° C. using a rotational viscometer, is preferably within a range from 10 to 1,000,000 mPa·s, and more preferably from 100 to 1,000,000 mPa·s. On the other hand, in those cases where the light emitting semiconductor device is produced by transfer molding or the like, either the type of liquid resin described above may be used, or alternatively, the molding can be conducted by using pellets prepared by solidifying (B-staging) the liquid resin and then pelletizing the solidified resin.

EXAMPLES

The present invention is described in more detail below based on a series of examples and comparative examples, although the present invention is in no way limited by the examples presented below.

Synthesis Example 1

Synthesis of a Branched Silicone Resin

A reaction flask was charged with 596.82 g (2.10 mols) of MeO(Me)$_2$SiO(Me$_2$SiO)$_n$Si(Me)$_2$OMe (average value of n=1.5), 95.34 g (0.70 mols) of phenyltrimethoxysilane (KBM103, manufactured by Shin-Etsu Chemical Co., Ltd.), and 1,250 ml of isopropyl alcohol, 21.75 g of a 25% aqueous solution of tetramethylammonium hydroxide and 195.75 g of water were then added, and the resulting mixture was stirred for 3 hours at room temperature. Following completion of the reaction, 1,250 ml of toluene was added to the reaction system, and the reaction mixture was neutralized with an aqueous solution of sodium dihydrogen phosphate. Using a separating funnel, the residue was washed with hot water. The toluene was then removed under reduced pressure, yielding an oligomer. To this oligomer were added 517.44 g (2.10 mols) of 3-(3,4-epoxycyclohexyl)ethyltrimethoxysilane (KBM303, manufactured by Shin-Etsu Chemical Co., Ltd.) and 600 ml of isopropyl alcohol, and then 21.75 g of a 25% aqueous solution of tetramethylammonium hydroxide and 195.75 g of water. The resulting mixture was stirred for 3 hours at room temperature. Following completion of the reaction, 1,250 ml of toluene was added to the reaction system, and the reaction mixture was neutralized with an aqueous solution of sodium dihydrogen phosphate. Using a separating funnel, the residue was washed with hot water. The toluene was then removed under reduced pressure, yielding the target resin (referred to as "resin 1"). The epoxy equivalent weight was 441 g/mol.

Synthesis Example 2

Synthesis of a Branched Silicone Resin

A reaction flask was charged with 300 g (1.056 mols) of MeO(Me)$_2$SiO(Me$_2$SiO)$_n$Si(Me)$_2$OMe (average value of n=1.5), 69.77 g (0.352 mols) of phenyltrimethoxysilane (KBM103, manufactured by Shin-Etsu Chemical Co., Ltd.), 260.10 g (1.056 mols) of 3-(3,4-epoxycyclohexyl)ethyltrimethoxysilane (KBM303, manufactured by Shin-Etsu Chemical Co., Ltd.), and 600 ml of isopropyl alcohol, 14.36 g of a 25% aqueous solution of tetramethylammonium hydroxide and 129.24 g of water were then added, and the resulting mixture was stirred for 3 hours at room temperature. Following completion of the reaction, 600 ml of toluene was added to the reaction system, and the reaction mixture was neutralized with an aqueous solution of sodium dihydrogen phosphate. Using a separating funnel, the residue was washed with hot water. The toluene was then removed under reduced pressure, yielding the target resin (referred to as "resin 2"). The epoxy equivalent weight was 492 g/mol.

Synthesis Example 3

Synthesis of a Branched Silicone Resin

A reaction flask was charged with 355.75 g (1.252 mols) of MeO(Me)$_2$SiO(Me$_2$SiO)$_n$Si(Me)$_2$OMe (average value of n=1.5), 82.74 g (0.417 mols) of phenyltrimethoxysilane (KBM103, manufactured by Shin-Etsu Chemical Co., Ltd.), and 1,000 ml of isopropyl alcohol, 35.68 g of a 25% aqueous solution of tetramethylammonium hydroxide and 321.12 g of water were then added, and the resulting mixture was stirred for 3 hours at room temperature. Following completion of the reaction, 1,000 ml of toluene was added to the reaction system, and the reaction mixture was neutralized with an aqueous solution of sodium dihydrogen phosphate. Using a separating funnel, the residue was washed with hot water. The toluene was then removed under reduced pressure, yielding an oligomer. To this oligomer were added 616.87 g (2.504 mols) of 3-(3,4-epoxycyclohexyl)ethyltrimethoxysilane (KBM303, manufactured by Shin-Etsu Chemical Co., Ltd.) and 1,000 ml of isopropyl alcohol, and then 35.68 g of a 25% aqueous solution of tetramethylammonium hydroxide and 321.12 g of water. The resulting mixture was stirred for 3 hours at room temperature. Following completion of the reaction, 1,000 ml of toluene was added to the reaction system, and the reaction mixture was neutralized with an aqueous solution of sodium dihydrogen phosphate. Using a separating funnel, the residue was washed with hot water. The toluene was then removed under reduced pressure, yielding the target resin (referred to as "resin 3"). The epoxy equivalent weight was 336 g/mol.

Synthesis Example 4

Synthesis of a Branched Silicone Resin

A reaction flask was charged with 250 g (0.880 mols) of MeO(Me)$_2$SiO(Me$_2$SiO)$_n$Si(Me)$_2$OMe (average value of n=1.5), 87.22 g (0.440 mols) of phenyltrimethoxysilane (KBM103, manufactured by Shin-Etsu Chemical Co., Ltd.), and 520 ml of isopropyl alcohol, 12.54 g of a 25% aqueous solution of tetramethylammonium hydroxide and 112.86 g of water were then added, and the resulting mixture was stirred for 3 hours at room temperature. Following completion of the reaction, 600 ml of toluene was added to the reaction system, and the reaction mixture was neutralized with an aqueous solution of sodium dihydrogen phosphate. Using a separating funnel, the residue was washed with hot water. The toluene was then removed under reduced pressure, yielding an oligomer. To this oligomer were added 216.75 g (0.880 mols) of 3-(3,4-epoxycyclohexyl)ethyltrimethoxysilane (KBM303, manufactured by Shin-Etsu Chemical Co., Ltd.) and 520 ml of isopropyl alcohol, and then 12.54 g of a 25% aqueous solution of tetramethylammonium hydroxide and 112.86 g of water. The resulting mixture was stirred for 3 hours at room temperature. Following completion of the reaction, 600 ml of toluene was added to the reaction system, and the reaction mixture was neutralized with an aqueous solution of sodium dihydrogen phosphate. Using a separating funnel, the residue was washed with hot water. The toluene was then removed under reduced pressure, yielding the target resin (referred to as "resin 4"). The epoxy equivalent weight was 504 g/mol.

Synthesis Example 5

Synthesis of a Branched Silicone Resin

A reaction flask was charged with 521 g (1.833 mols) of MeO(Me)$_2$SiO(Me$_2$SiO)$_n$Si(Me)$_2$OMe (average value of n=1.5), 83.23 g (0.611 mols) of methyltrimethoxysilane (KBM13, manufactured by Shin-Etsu Chemical Co., Ltd.), and 1,000 ml of isopropyl alcohol, and with the internal temperature maintained at 20° C. or lower, 24.01 g of a 25% aqueous solution of tetramethylammonium hydroxide and 103.68 g of water were added dropwise to the flask over a period of 30 minutes. After subsequent aging for 3 hours, 1,000 ml of toluene was added to the reaction system, and the reaction mixture was neutralized with an aqueous solution of sodium dihydrogen phosphate. Using a separating funnel, the residue was washed with hot water. The toluene was then removed under reduced pressure, yielding an oligomer. To this oligomer was added 451.70 g (1.833 mols) of 3-(3,4-epoxycyclohexyl)ethyltrimethoxysilane (KBM303, manufactured by Shin-Etsu Chemical Co., Ltd.), and the resulting mixture was stirred for 3 hours at room temperature. Following completion of the reaction, 1,000 ml of toluene was added to the reaction system, and the reaction mixture was neutralized with an aqueous solution of sodium dihydrogen phosphate. Using a separating funnel, the residue was washed with hot water. The toluene was then removed under reduced pressure, yielding the target resin (referred to as "resin 5"). The epoxy equivalent weight was 435 g/mol.

Synthesis Example 6

Synthesis of a Linear Silicone Resin Containing Epoxy Groups

A reaction flask was charged with 1,500 g (1.975 mols) of MeO(Me)$_2$SiO(Me$_2$SiO)$_n$Si(Me)$_2$OMe (average value of n=8), 973.2 g (3.950 mols) of 3-(3,4-epoxycyclohexyl)ethyltrimethoxysilane (KBM303, manufactured by Shin-Etsu Chemical Co., Ltd.), and 2,300 ml of isopropyl alcohol, 49.90 g of a 25% aqueous solution of tetramethylammonium hydroxide and 449.10 g of water were then added, and the resulting mixture was stirred for 3 hours at room temperature. Following completion of the reaction, 2,300 ml of toluene was added to the reaction system, and the reaction mixture was neutralized with an aqueous solution of sodium dihydrogen phosphate. Using a separating funnel, the residue was washed with hot water. The toluene was then removed under reduced pressure, yielding the target resin (referred to as "resin 6"). The epoxy equivalent weight was 570 g/mol.

Synthesis Example 7

Synthesis of a Branched Silicone Resin

A reaction flask was charged with 410 g (1.443 mols) of MeO(Me)$_2$SiO(Me$_2$SiO)$_n$Si(Me)$_2$OMe (average value of n=1.5), 65.50 g (0.481 mols) of phenyltrimethoxysilane (KBM103, manufactured by Shin-Etsu Chemical Co., Ltd.), and 1,100 ml of isopropyl alcohol, 40.39 g of a 25% aqueous solution of tetramethylammonium hydroxide and 363.51 g of water were added dropwise to the flask over a period of 30 minutes, and after subsequent reaction for 3 hours, 1,100 ml of toluene was added to the reaction system, and the reaction mixture was neutralized with an aqueous solution of sodium dihydrogen phosphate. The residue was washed with hot water. The toluene was then removed under reduced pressure, yielding an oligomer. To this oligomer was added 681.79 g (2.885 mols) of 3-glycidoxypropyltrimethoxysilane (KBM403, manufactured by Shin-Etsu Chemical Co., Ltd.), and the resulting mixture was stirred for 3 hours at room temperature. Following completion of the reaction, 1,100 ml of toluene was added to the reaction system, and the reaction mixture was neutralized with an aqueous solution of sodium dihydrogen phosphate. Using a separating funnel, the residue was washed with hot water. The toluene was then removed under reduced pressure, yielding the target resin (referred to as "resin 7"). The epoxy equivalent weight was 296 g/mol.

Synthesis Example 8

Synthesis of a Linear Silicone Resin Containing Epoxy Groups

A reaction flask was charged with 1,695.6 g (5.966 mols) of MeO(Me)$_2$SiO(Me$_2$SiO)$_n$Si(Me)$_2$OMe (average value of n=1.5), 3,000 ml of isopropyl alcohol, and 1,470 g (5.966 mols) of 3-(3,4-epoxycyclohexyl)ethyltrimethoxysilane (KBM303, manufactured by Shin-Etsu Chemical Co., Ltd.), 72 g of a 25% aqueous solution of tetramethylammonium hydroxide and 648 g of water were then added, and the resulting mixture was stirred for 3 hours at room temperature. Following completion of the reaction, 3,000 ml of toluene was added to the reaction system. Subsequently preparation was performed in the same manner as synthesis example 1, yielding the target resin (referred to as "resin 8"). The epoxy equivalent weight was 403 g/mol.

Synthesis Example 9

Synthesis of a Condensed Resin of an Epoxy Group-Containing Silane and a Silanol In a reaction flask, 11.8 g (0.05 mols) of 3-glycidoxypropyltrimethoxysilane (KBM403, manufactured by Shin-Etsu Chemical Co., Ltd.) was heated to 120° C., and with this temperature maintained, 57.8 g (0.025 mols) of HO(Ph)(C$_3$H$_7$)SiO[(Ph)(C$_3$H$_7$)SiO]$_n$Si(Ph)(C$_3$H$_7$)OH (average value of n being about 8) was added dropwise over a period of 15 minutes. Subsequently, the resulting mixture was stirred for 4 hours at 120° C., while methanol was removed by evaporation and a stream of nitrogen was blown into the reaction system from above, thus yielding the target resin (referred to as "resin 9"). The epoxy equivalent weight was 1,210 g/mol.

Each obtained resin (A) was subjected to melt mixing with the materials listed below to prepare compositions.

(B) Curing agent: 4-methylhexahydrophthalic anhydride (RIKACID MH, manufactured by New Japan Chemical Co., Ltd.)

(C) Curing catalyst: a quaternary phosphonium salt (UCAT5003, manufactured by San-Apro Ltd.)

(D) Epoxy resin: (3',4'-epoxycyclohexane)methyl 3,4-epoxycyclohexyl-carboxylate (CELLOXIDE 2021P, manufactured by Daicel Chemical Industries, Ltd.)

Mercapto-based silane coupling agent: 3-mercaptopropylmethyldimethoxysilane (KBM-803, manufactured by Shin-Etsu Chemical Co., Ltd.)

Example 1

The resin 1 prepared in synthesis example 1, 0.5 equivalent of the curing agent per 1 equivalent of the resin 1, and 0.39 parts by weight of the curing catalyst per 100 parts by weight of the mixture of the resin 1 and the curing agent were subjected to melt mixing, yielding a resin composition.

Example 2

78 parts by weight of the resin 1, 22 parts by weight of the epoxy resin (D), 0.5 equivalent of the curing agent per 1 equivalent of the mixture of the resin 1 and the epoxy resin, and 0.39 parts by weight of the curing catalyst per 100 parts by weight of the mixture of the resins and the curing agent were subjected to melt mixing, yielding a composition.

Example 3

78 parts by weight of the resin 2, 22 parts by weight of the epoxy resin (D), 0.5 equivalent of the curing agent per 1 equivalent of the mixture of the resin 2 and the epoxy resin, and 0.39 parts by weight of the curing catalyst per 100 parts by weight of the mixture of the resins and the curing agent were subjected to melt mixing, yielding a composition.

Example 4

78 parts by weight of the resin 3, 22 parts by weight of the epoxy resin (D), 0.5 equivalent of the curing agent per 1 equivalent of the mixture of the resin 3 and the epoxy resin, and 0.39 parts by weight of the curing catalyst per 100 parts by weight of the mixture of the resins and the curing agent were subjected to melt mixing, yielding a composition.

Example 5

78 parts by weight of the resin 4, 22 parts by weight of the epoxy resin (D), 0.5 equivalent of the curing agent per 1 equivalent of the mixture of the resin 4 and the epoxy resin, and 0.39 parts by weight of the curing catalyst per 100 parts by weight of the mixture of the resins and the curing agent were subjected to melt mixing, yielding a composition.

Example 6

78 parts by weight of the resin 5, 22 parts by weight of the epoxy resin (D), 0.5 equivalent of the curing agent per 1 equivalent of the mixture of the resin 5 and the epoxy resin, and 0.39 parts by weight of the curing catalyst per 100 parts by weight of the mixture of the resins and the curing agent were subjected to melt mixing, yielding a composition.

Example 7

1 part by weight of the resin 1, 22 parts by weight of the resin 7, 67 parts by weight of the resin 6, 0.5 equivalent of the curing agent per 1 equivalent of the mixture of the resin 1 and the epoxy resin, and 0.39 parts by weight of the curing catalyst per 100 parts by weight of the mixture of the resins and the curing agent were subjected to melt mixing, yielding a composition.

Example 8

78 parts by weight of the resin 7, 22 parts by weight of the epoxy resin (D), 0.5 equivalent of the curing agent per 1 equivalent of the mixture of the resin 7 and the epoxy resin, and 0.39 parts by weight of the curing catalyst per 100 parts by weight of the mixture of the resins and the curing agent were subjected to melt mixing, yielding a composition.

Example 9

78 parts by weight of the resin 1, 22 parts by weight of the epoxy resin (D), 0.5 equivalent of the curing agent per 1 equivalent of the mixture of the resin 1 and the epoxy resin, and 0.39 parts by weight of the curing catalyst and 0.25 parts by weight of the silane coupling agent per 100 parts by weight of the mixture of the resins and the curing agent were subjected to melt mixing, yielding a composition.

Comparative Example 1

78 parts by weight of the resin 8, 22 parts by weight of the epoxy resin (D), 0.5 equivalent of the curing agent per 1 equivalent of the mixture of the resin 8 and the epoxy resin, and 0.39 parts by weight of the curing catalyst per 100 parts by weight of the mixture of the resins and the curing agent were subjected to melt mixing, yielding a composition.

Comparative Example 2

90 parts by weight of the resin 6, 10 parts by weight of the epoxy resin (D), 0.5 equivalent of the curing agent per 1 equivalent of the mixture of the resin 6 and the epoxy resin, and 0.39 parts by weight of the curing catalyst per 100 parts by weight of the mixture of the resins and the curing agent were subjected to melt mixing, yielding a composition.

Comparative Example 3

78 parts by weight of the resin 9, 22 parts by weight of the epoxy resin (D), 0.5 equivalent of the curing agent per 1 equivalent of the mixture of the resin 9 and the epoxy resin, and 0.39 parts by weight of the curing catalyst per 100 parts by weight of the mixture of the resins and the curing agent were subjected to melt mixing, yielding a composition.

Evaluation of Cured Products

Each composition was cured by heating for 2 hours at 100° C., and then post-cured for 4 hours at 150° C., yielding a rod-shaped cured product with a thickness of 5 mm. This rod-shaped cured product was evaluated for external appearance, flexural elastic modulus and flexural strength (JIS K-6911), external appearance following a heat resistance test (5 hours at 200° C.), and light transmittance following a UV resistance test. The light transmittance was measured by scanning from 800 to 300 nm, and with the initial light transmittance at 400 nm deemed to be 100%, the light transmittance was measured following 12 hours of UV irradiation (using a high-pressure mercury-vapor lamp: 30 mW/cm$^2$, 365 nm). The results are shown in Table 1.

TABLE 1

| | Example | | | | | |
|---|---|---|---|---|---|---|
| | 1 | 2 | 3 | 4 | 5 | 6 |
| External appearance after curing | colorless, transparent | colorless, transparent | colorless, transparent | colorless, transparent | colorless, transparent | colorless, transparent |
| Hardness (Shore D) | 76 | 76 | 74 | 81 | 74 | 75 |
| Flexural elastic modulus (N/mm$^2$) | 510 | 510 | 580 | 1250 | 810 | 330 |
| Flexural strength (N/mm$^2$) | 28 | 27 | 28 | 43 | 24 | 27 |
| UV resistance (%) | 92 | 95 | 95 | 92 | 90 | 98 |
| Heat resistance (200° C., 5 hr) | colorless, transparent | colorless, transparent | colorless, transparent | colorless, transparent | colorless, transparent | colorless, transparent |

TABLE 1-continued

| | Example | | | Comparative example 1 | Comparative example 2 | Comparative example 3 |
|---|---|---|---|---|---|---|
| | 7 | 8 | 9 | | | |
| External appearance after curing | colorless, transparent | colorless, transparent | colorless, transparent | colorless, transparent | colorless, transparent | colorless, transparent |
| Hardness (Shore D) | 61 | 72 | 75 | 74 | 45 | 40 |
| Flexural elastic modulus (N/mm$^2$) | 510 | 560 | 550 | 510 | measurement impossible | measurement impossible |
| Flexural strength (N/mm$^2$) | 13 | 22 | 25 | measurement impossible | measurement impossible | measurement impossible |
| UV resistance (%) | 95 | 97 | 95 | 95 | 90 | 85 |
| Heat resistance (200° C., 5 hr) | colorless, transparent | colorless, transparent | colorless, transparent | colorless, transparent | colorless, transparent | colorless, transparent |

LED Devices

Using each of the compositions from examples 2 and 9, and comparative examples 1 and 3, the method described below was used to prepare three LED devices with each composition. An InGaN-based blue light emitting element was secured with a silver paste to the silver-plated base portion of a 3 mm square premolded LED package having a thickness of 1 mm and an opening with a diameter of 2.6 mm. Subsequently, an external electrode was connected to the light emitting element using a gold wire. One of the above compositions was used to fill the package opening, and the composition was then cured by heating for one hour at 100° C. and then for a further two hours at 150° C., thus completing preparation of an LED device. The prepared LED devices were subjected to a temperature cycle test under the conditions listed below, and an LED lighting test for 500 hours under conditions of 65° C. and 95% RH, and were then evaluated visually for adhesion faults at the package interface, the presence of cracks, and the existence of discoloration. The results are shown in Table 2.

Temperature cycle test conditions
Temperature: −40° C. to 125° C.
Number of cycles: 1,000

Adhesive Strength

Using each of the compositions from examples 2 and 9, and comparative examples 1 and 3, adhesion test pieces were prepared using the following method. Namely, a thin coating of the composition was applied to a silver-plated copper sheet, a 2 mm square silicon chip was positioned on top of the composition, and the composition was cured by heating for one hour at 100° C. and then for a further two hours at 150° C., thus completing preparation of an adhesion test piece. The prepared adhesion test piece was measured for adhesive strength at rupture using a die bond tester (apparatus name: Dage Series 4000 Bondtester, test speed: 200 μm/s, test height: 10.0 μm, measurement temperature: 25° C.).

TABLE 2

| Resin composition | Example 2 | Example 9 | Comparative example 1 | Comparative example 3 |
|---|---|---|---|---|
| Temperature cycle test (−40° C. to 125° C.) 1,000 cycles Defective fraction | 1/3 (detachment) | 0/3 | 3/3 (cracking) | 3/3 (detachment and cracking) |
| High-humidity high-temperature lighting test (65° C./95% RH, 50 mA, 500 hr) Defective fraction | 1/3 (detachment) | 0/3 | 3/3 (discoloration) | 3/3 (discoloration) |
| Adhesive strength (2 × 2 mm test piece, kg/mm$^2$) | 1.7 | 2.8 | 1.1 | 0.8 |

As can be seen in Table 1, the cured products obtained from the compositions of the examples had a high degree of hardness and exhibited excellent flexural strength. In contrast, the compositions of comparative examples 1 and 2, which did not contain a branched silicone resin, and the composition of comparative example 3 prepared from a silane yielded softer cured products, and the flexural strength and the like could not be measured.

Furthermore, as is evident from Table 2, the LED devices prepared using the compositions of the present invention exhibited excellent thermal shock resistance during the temperature cycle test, and suffered almost no discoloration even when illuminated with the LED for 500 hours.

The composition of the present invention forms a cured product that has excellent transparency and hardness, and is therefore useful as an optical element encapsulating resin. Furthermore, the composition also exhibits excellent adhesive strength, and is therefore also useful as a die bonding agent.

What is claimed is:

1. A resin composition for encapsulating an optical semiconductor element, comprising components (A), (B), (C), and (D) described below:

(A) a branched silicone resin containing 2 to 6 epoxy groups, one or more ($R^1SiO_{3/2}$) units, two or more ($R^2R^3SiO$)$_n$ structures and 3 or more ($R^4_{3-x}R^5_xSiO_{3/2}$) units per molecule, in an amount of 100 parts by weight, wherein $R^1$, $R^2$, $R^3$, $R^4$ and $R^5$ each represents a hydrogen atom, a hydroxyl group or a monovalent organic group of 1 to 20 carbon atoms which monovalent organic group may or may not contain an oxygen atom, provided that at least two of the $R^5$ groups within each molecule represent an epoxy group and/or an epoxy group-containing non-aromatic group, n represents an integer of 3 to 20, and x represents an integer of 1 to 3, (B) a curing agent, in such an amount that a content of epoxy reactive groups in the component (B) ranges from 0.4 to 1.5 moles per 1 mol of epoxy groups within component (A), (C) a curing catalyst, in an amount within a range from 0.01 to 3 parts by weight per 100 parts by weight of a combination of component (A) and component (B) and (D) a diepoxy carboxylate.

2. The resin composition for encapsulating an optical semiconductor element according to claim 1, wherein the branched silicone resin (A) is represented by an average composition formula (1) shown below:

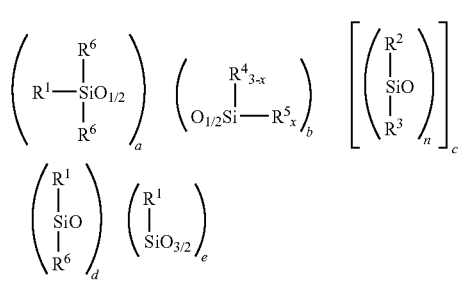

wherein $R^1$ to $R^5$, n and x are as defined above, $R^6$ represents a hydroxyl group or an alkoxy group of 1 to 6 carbon atoms, a is a number from 0 to 0.3, b is a number from 0.3 to 0.7, c is a number from 0.2 to 0.6, d is a number from 0 to 0.3, and e is a number from 0.1 to 0.4, provided that a sum of a to e is 1.

3. The resin composition for encapsulating an optical semiconductor element according to claim 1, wherein a styrene-referenced weight average molecular weight of the branched silicone resin (A) measured by GPC is within a range from 4,000 to 10,000.

4. The resin composition for encapsulating an optical semiconductor element according to claim 1, wherein an epoxy equivalent weight of the branched silicone resin (A) is within a range from 200 to 600 g/mol.

5. The resin composition for encapsulating an optical semiconductor element according to claim 1, wherein $R^1$ is a phenyl group, and $R^2$ and $R^3$ are methyl groups, and the epoxy group-containing non-aromatic group is a β-(3,4-epoxycyclohexyl)ethyl group.

6. The resin composition for encapsulating an optical semiconductor element according to claim 1, wherein component (D) is present in an amount of 22 to 50 parts by weight per 100 parts by weight of a combination of component (A) and component (D).

7. The resin composition for encapsulating an optical semiconductor element according to claim 1, wherein the curing agent (B) is an acid anhydride.

8. The resin composition for encapsulating an optical semiconductor element according to claim 1, further comprising a mercapto-based silane coupling agent.

9. The resin composition for encapsulating an optical semiconductor element according to claim 1, wherein component (D) is (3',4'-epoxycyclohexane)methyl 3,4-epoxycyclohexyl-carboxylate.

* * * * *